United States Patent [19]

Gunn et al.

[11] Patent Number: 5,493,722

[45] Date of Patent: Feb. 20, 1996

[54] METHOD FOR CONTROLLING DATA TRANSMISSIONS ON A SINGLE CHANNEL RADIO FREQUENCY NETWORK

[75] Inventors: John T. Gunn, Charlotte; David R. Pritchard, Winston-Salem, both of N.C.

[73] Assignee: Ingersoll-Rand Company, Woodcliff Lake, N.J.

[21] Appl. No.: 185,740

[22] Filed: Jan. 24, 1994

[51] Int. Cl.$^6$ .............................. H04B 7/00; G08C 17/02
[52] U.S. Cl. .......................... 455/54.1; 455/66; 455/67.1; 340/870.15; 340/870.16
[58] Field of Search .......................... 455/88, 54.1, 67.1, 455/56.1, 66, 49.1, 53.1, 68, 70; 370/85.2, 85.3, 85.1, 95.2; 340/853.8, 854.6, 856.2, 870.11, 870.15, 825.54, 855.4, 855.5, 870.16, 870.01, 870.04; 342/50, 51

[56] References Cited

U.S. PATENT DOCUMENTS

| | | | |
|---|---|---|---|
| 4,057,785 | 11/1977 | Furniss et al. | 340/870.15 |
| 5,042,083 | 8/1991 | Ichikawa | 370/85.3 |
| 5,046,066 | 9/1991 | Messenger | 455/66 |
| 5,194,860 | 3/1993 | Jones et al. | 455/67.1 |
| 5,220,564 | 6/1993 | Tuch et al. | 455/88 |

*Primary Examiner*—Reinhard J. Eisenzopf
*Assistant Examiner*—Nguyen Vo
*Attorney, Agent, or Firm*—John J. Selko; Michael M. Gnibus

[57] ABSTRACT

A site system for remotely monitoring and controlling portable machines is provided which includes a single channel radio frequency network. At least one portable machine has a microcontroller for controlling operation of the portable machine, a plurality of sensors for supplying machine operational data to the microcontroller, and a radio frequency transceiver unit. The radio frequency transceiver unit communicates with the microcontroller, and with the single channel radio frequency network. At least one host computer has a radio frequency transceiver unit. The host computer communicates with a predetermined portable machine by data transmissions on the single channel radio frequency network. A radio frequency protocol controls radio frequency data transmissions on the single channel radio frequency network.

4 Claims, 4 Drawing Sheets

METHOD FOR CONTROLLING DATA TRANSMISSIONS ON A SINGLE CHANNEL RADIO FREQUENCY NETWORK

BACKGROUND OF THE INVENTION

This invention generally relates to data transmissions, and more particularly, to a radio frequency network data communications protocol for controlling data transmissions on a single channel radio frequency thereby permitting low cost telemetry for portable machines.

Portable machines, such as air compressors, rock drilling equipment, and other pneumatically actuated construction type equipment typically operate at remote work sites, which may be located many miles from an appropriate portable machine service center. During a typical operation cycle of a predetermined portable machine, the machine may require routine preventative maintenance and/or mandatory maintenance due to the occurrence of a fault condition which may have caused the portable machine to independently shutdown.

The efficiency with which such portable machines are serviced may be dramatically increased if real time or near real time operation data is remotely retrieved by service personnel directly from the individual portable machines. Such a real time or near real time retrieval of operation data from the individual machines may be facilitated by providing a telemetry system or a radio frequency communications network for the portable machines, which typically may include one radio channel with which to transmit data communications. This radio frequency communications network must permit data communications, containing portable machine operational information and/or portable machine operational commands, to be transmitted to and/or from the portable machines. Also, the data communications must be transmitted completely, accurately and timely.

Therefore, it would be advantageous to provide a radio frequency data communications network protocol for controlling data transmissions on a single channel radio frequency to permit the implementation of a low cost telemetry system for use with portable machines.

SUMMARY OF THE INVENTION

In one aspect of the present invention, this is accomplished by providing a site system for remotely monitoring and controlling portable machines. The site system includes a single channel radio frequency network. At least one portable machine has a microcontroller for controlling operation of the portable machine, a plurality of sensors for supplying machine operational data to the microcontroller, and a radio frequency transceiver unit having a radio modem for modulating and demodulating data signals. The radio frequency transceiver unit communicates with the microcontroller. Additionally, the radio frequency transceiver transmits data signals on, and receives data signals from, the single channel radio frequency network. At least one host computer has a radio frequency transceiver unit which includes a radio modem for modulating and demodulating data signals. The host computer communicates with a predetermined portable machine by data transmissions on the single channel radio frequency network. A radio frequency protocol controls radio frequency data transmissions on the single channel radio frequency network.

The radio frequency protocol is controlled by a predetermined logic routine which begins by initializing each node, e.g. a portable machine or a host computer, upon establishing communication between the node and the network. This initializing is accomplished by setting a first flag to a first predetermined value, and setting first and second timers to predetermined time values. The first timer is then started to permit tracking the occurrence of a first predetermined command during the time value of the first timer. Next, an appropriate message is detected during a predetermined interval of time. The message has a predetermined, unique message structure. Thereafter, the logic detects a request to send command from the appropriate message structure. If a request to send command is detected, the first flag is set to the first predetermined value, and the first timer is re-started. Thereafter, the logic detects a clear to send command from the appropriate message structure. If a clear to send command is detected, the first flag is set to a second predetermined value. Next, the logic detects an application command from the appropriate message structure. If an application command is detected, the receiving node responds to the originating node of the application command. Thereafter, the logic determines a present need of the node to transmit a message to another predetermined node. Next, the value of the first flag is determined. If the first flag has the first predetermined value, the logic determines if the first time interval of the first timer has expired. Next, and simultaneously, a message, having a request to send command, is transmitted to all the nodes on the network, and the second timer is started. An appropriate application message is then transmitted to a predetermined node on the network. Thereafter, the transmitting node waits for an appropriate response from the predetermined node on the network. If an appropriate response is not detected from the predetermined node, a loopcounter is incremented, and the transmitting node waits a predetermined time interval to re-transmit the application message. The logic then determines if the second time interval of the second timer has expired. If said time interval has expired, a clear to send message is transmitted to all nodes on the network, and the first flag is set to the second value.

The foregoing and other aspects will become apparent from the following detailed description of the invention when considered in conjunction with the accompanying drawing figures.

BRIEF DESCRIPTION OF THE DRAWING FIGURES

FIGS. 2, 2a and 2b are flow charts describing operation of the radio frequency protocol for controlling data transmissions on the single channel radio frequency network.

DETAILED DESCRIPTION

Figure 1:
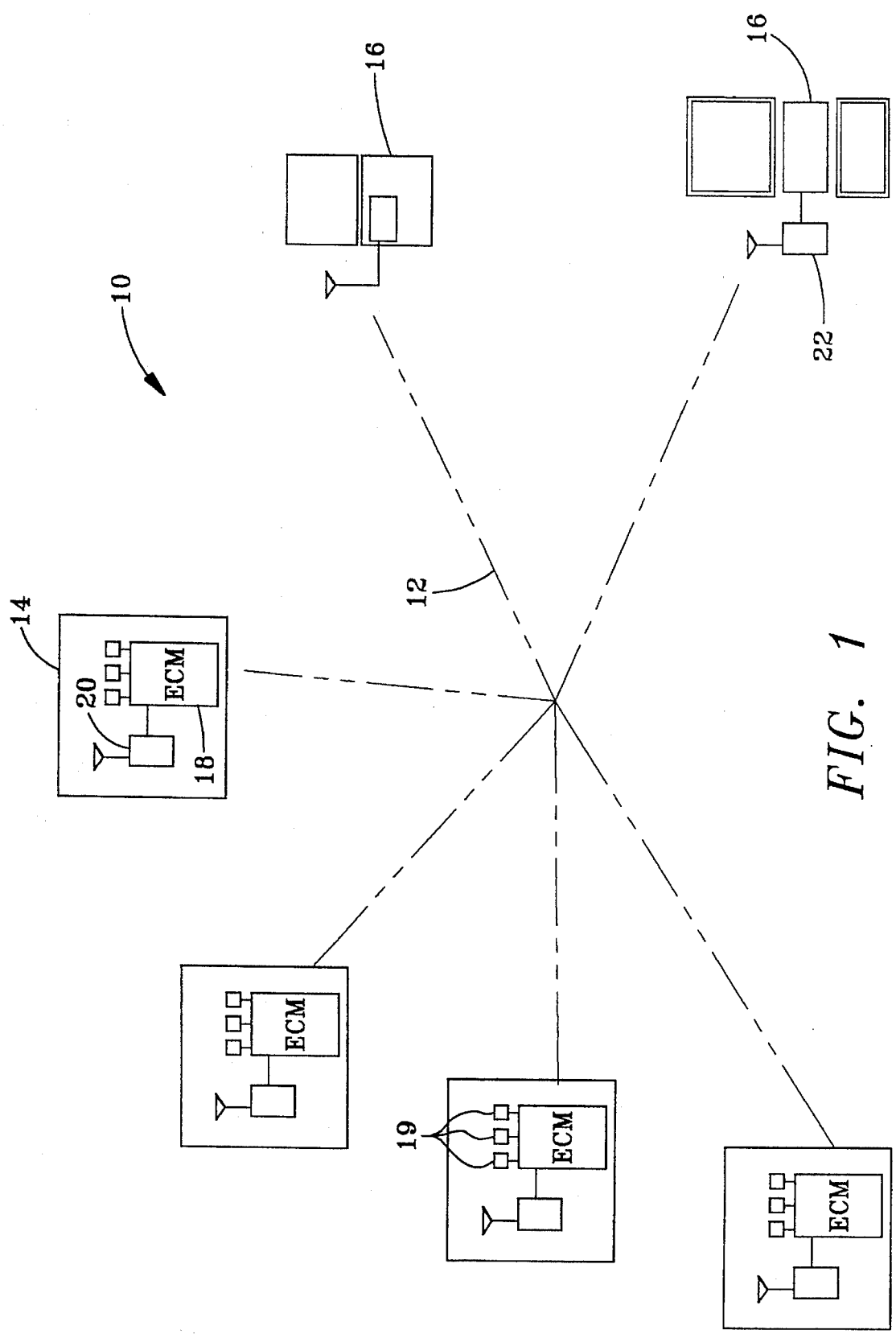
FIG. 1 is a block diagram of a single channel radio frequency network embodying the present invention.

Referring now to the drawings, a site system for remotely monitoring and controlling portable machines is illustrated generally at 10 in FIG. 1. The site system for remotely monitoring and controlling portable machines includes a single channel radio frequency network 12, at least one portable machine 14, and at least one host computer 16.

The single channel radio frequency network may utilize a non-licensable radio frequency signal. This signal may be a spread spectral signal in the 900 Mhz frequency band. This frequency band can provide an adequate communications range if the portable machines are in close proximity to each other. It is also recognized that the portable machines 14 may not be in close proximity to each other. In this case, a stronger radio frequency may be used (typically 460 to 470 Mhz). When these higher frequencies are used, an FCC license is required. These frequency ranges are used for illustration purposes and are not intended to be limiting.

The portable machine 14 is typically a portable compressor, portable drilling equipment, abrasive blasting equipment, or other similar devices. Often there are a plurality of portable machines 14 associated with a specific work site, and the portable machines are all located in close proximity to each other. Due to changing work conditions or functions, it is often desirable to reposition the portable machines to different locations within the same work site. It is highly desirable to ensure the ease of portability, while maintaining the capability to continually monitor and/or control the operation of the portable machines 14. The present invention permits a plurality of portable machines 14 to send data messages to (or receive data information from) a host computer 16. Also, the present invention permits each portable machine to send data messages to one or more predetermined machines.

It is envisioned that the portable machines 14 may operate independently from each other, or may operate in series with or in cooperation with each other. For example, more than one portable machine may be related to the same process wherein alteration of the operation of one of the portable machines will effect the desired operation of another of the portable machines (as may occur where multiple portable compressors are being successively used in different steps of the same chemical process). Under certain circumstances, there may be two portable machines which are operationally, directly connected to each other (for example a piece of drilling equipment and a compressor which applies compressed air to the drilling equipment). Under these circumstances, the host computer would have to be programmed to deal with these associations between the portable machines.

Each portable machine 14 includes a microcontroller 18 for controlling operation of the portable machine, a plurality of sensors 19 for supplying machine operational data to the microcontroller, and a radio frequency transceiver unit 20 having a radio modem (not shown) for modulating and demodulating data signals. The radio frequency transceiver unit 20 communicates with the microcontroller 18, and is operable for transmitting data signals on, and receiving data signals from, the single channel radio frequency network 12.

The microcontroller 18 is capable of controlling the operation of, and monitoring the output from, a respective portable machine 14. The microcontroller 18 is typically a microprocessor or microcomputer, with a suitable chip being the Intel 80C196 (Intel is a trademark of the Intel Corp.).

Within the site system 10 there is at least one host computer 16, however, typically there may be a plurality of host computers interacting with the site system 10 during operation of the portable machines. The host computer may be a standard lap top computer or it may be a typical personal work station type computer. These host computers may be operated by service personnel or operators of the portable machines. Each host computer includes a radio frequency transceiver unit 22, including a radio modem (not shown) for modulating and demodulating data signals. As illustrated by FIG. 1, the each host computer may communicate with a predetermined portable machine by data transmissions on the single channel radio frequency network 12.

Figure 2A:
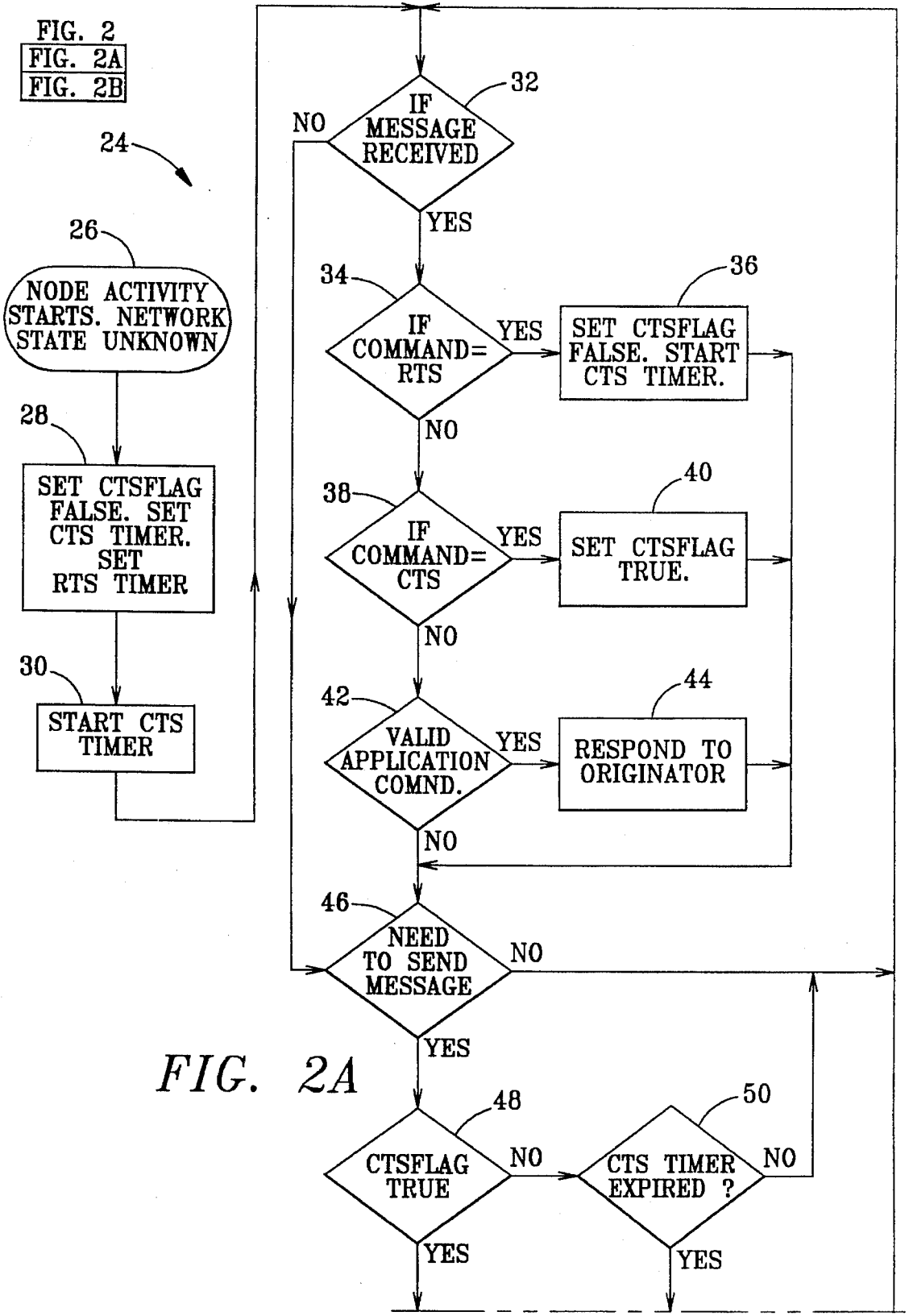
Figure 2B:
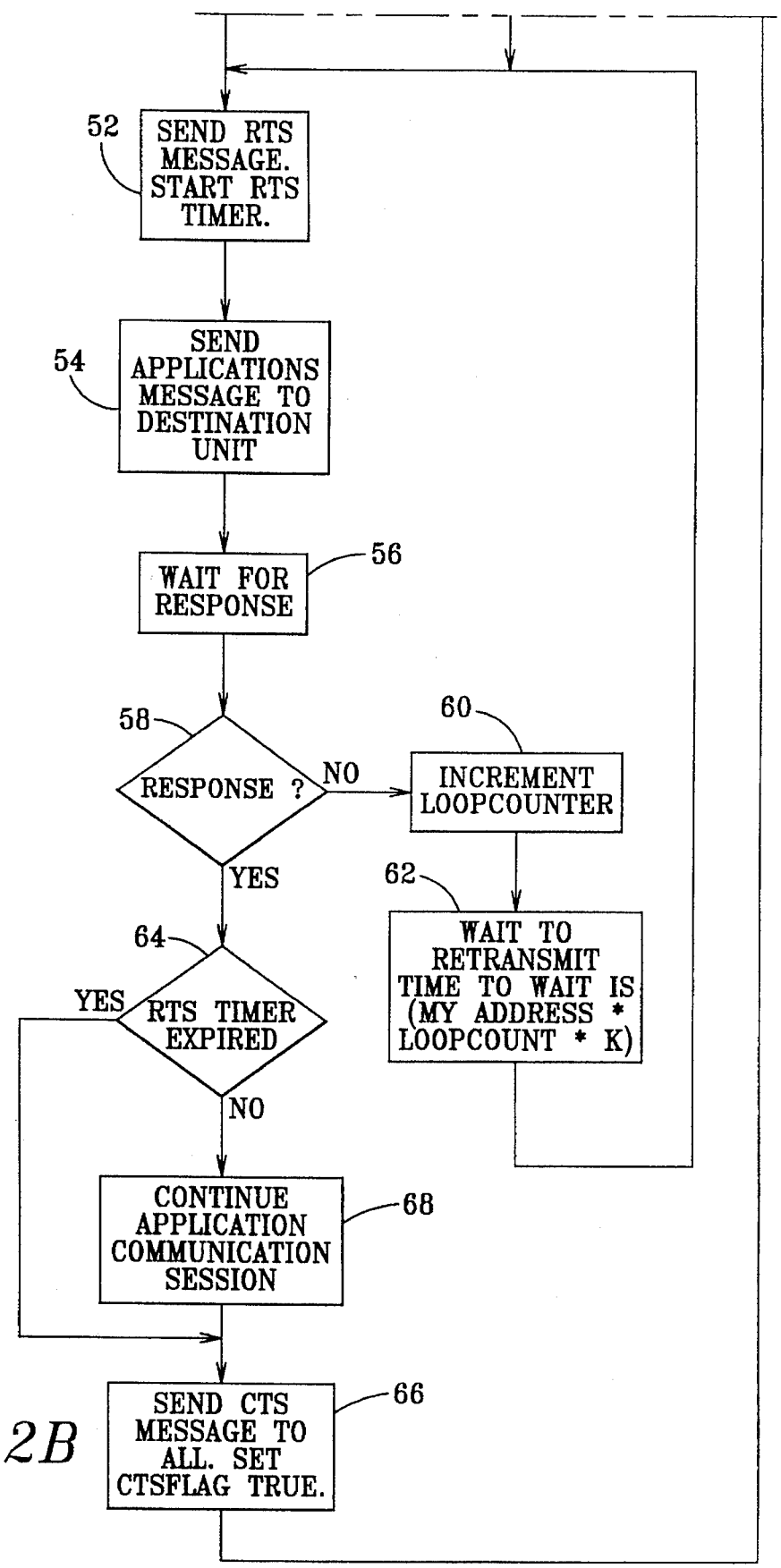

As described hereinabove, data transmissions are sent back and forth between nodes on the single channel radio frequency network. However, often these data transmissions will occur simultaneously causing a collision of the data transmissions on the single channel radio frequency network resulting in noise. Accordingly, the site system 10 of the present invention employs a radio frequency protocol means for controlling radio frequency data transmissions on the single channel radio frequency network which is utilized by each node on the single channel radio frequency network. A logic routine 24 of the radio frequency protocol is outlined in the flow chart which is provided for in FIG. 2, and which is described in further detail hereinafter.

Step 26 of the radio frequency protocol occurs when an individual node is prepared for entering the single channel radio frequency network, which typically occurs upon power-up of the individual node. At this moment, the node entering the single channel radio frequency network does not know the state of the network. Therefore, in Step 28 each node is initialized upon establishing communication between the node and the network. More particularly, during the initialization a first flag is set to a first predetermined value, and first and second timers are set to predetermined time values. The first flag is a clear to send flag and is used in the logic routine to track whether an individual node is clear to send a data transmission on the single channel radio frequency network. This flag may be set in either a first value which is false (i.e. the node is not clear to send a data transmission) or a second value which is true (i.e. the node is clear to send a data transmission). The first timer times an interval of time during which a clear to send command may be detected. The second timer times an interval of time during data transmissions of the individual node. The first and second timers will be explained in further detail hereinafter.

In Step 30 the first timer is started to permit tracking the occurrence of a first predetermined command during the time value of the first timer, the first predetermined command being the clear to send command which is understood by a node as the single channel radio frequency network being available for data transmissions.

Figure 3:
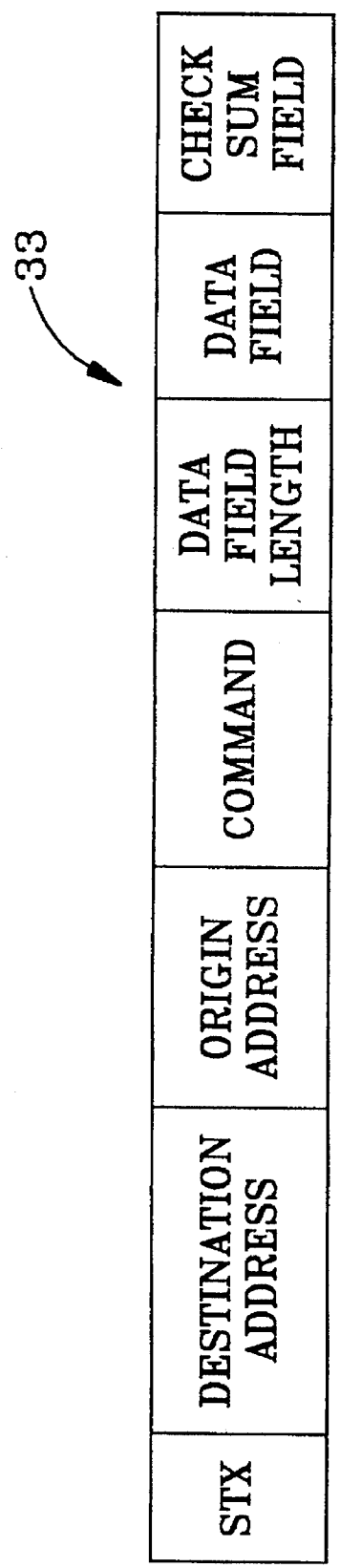
FIG. 3 is a diagram of the message structure which is utilized by the radio frequency protocol of the present invention.

In Step 32 an appropriate message is detected by the node during a predetermined interval of time. For example, the node may have a time interval of 8 seconds to determine whether a message is an appropriate message. The single channel radio frequency network utilizes a predetermined, unique message structure 33 which is diagrammed in FIG. 3. As illustrated by FIG. 3, the unique message structure 33 comprises a STX field, a destination address field, an origin address field, a command field, a data field length, a data field and a check sum field. Step 32 is a screening step or a noise rejection step which quickly determines whether a data transmission is an appropriate message for the individual node. The logic employed by Step 32 is able to reject a message after evaluating any field of the message structure. For example, if a message is transmitted on the single channel radio frequency network having the structure outlined in FIG. 3, Step 32 initially evaluates the STX field, if it is valid, it next evaluates the destination address, and then proceeds to evaluate the remaining fields in succession. At any time during the evaluation of any one of the message fields of the message, if a field is determined to be not valid, not appropriate, or incomprehensible, the logic of Step 32 will reject the incoming message and return to a passive mode of listening for an appropriate message.

If a message is not rejected by Step 32, in Step 34 the logic determines whether the message contains a request to send command from another node. If a request to send command is detected, in Step 36 the first flag is set to false, and the first timer is re-started. In Step 36, the node accepts that it is not clear to transmit a data message, and the node waits until a clear to send command has been received or until the first timer times out.

In Step 38, the logic determines whether the message contains a clear to send command from another node. If a clear to send command is detected, the first flag is set to true in Step 40.

If the logic has not detected a request to send command in Step 34 or a clear to send command in Step 38, the logic searches for an application command from the appropriate message structure in Step 42. If an application command is detected in Step 42, the node will respond to an originating node of the application command in Step 44.

If a message has not been received by the node, or if the logic has not detected a request to send command in Step 34, a clear to send command in Step 38, or an application command in Step 42, the logic determines the node's present need to transmit a message to a predetermined node in Step 46. If there is a present need to transmit a message, in Step 48 the logic determines the value of the first flag, i.e. the logic determines whether the first flag is true (meaning that a clear to send command has been detected by the node). If a clear to send command has not been detected by the logic, in Step 50 the logic determines whether the first time interval of the first timer has expired.

In Step 52 the node simultaneously transmits a message having a request to send command to all nodes on the network, and starts the second timer, which provides a predetermined time interval during which the node is permitted to transmit. The node transmits an appropriate application message to a predetermined node on the network at Step 54, and in Step 56 the logic waits for an appropriate response from the predetermined node on the network. If an appropriate response is not detected from said node in Step 58, a loopcounter is incremented in Step 60, and a waiting period is calculated in Step 62 which governs when the node may re-transmit the application message. The waiting period is calculated by taking the value of the transmitting node's address and multiplying this value by the loopcount, then, this value is multiplied by a predetermined constant K. This result is the period of time during which the node must wait to re-transmit the message.

After the logic has evaluated a valid response in Step 58, in Step 64 the logic determines if the second time interval of the second timer has expired. If this time interval has expired, the transmitting node sends a clear to send command to all nodes on the network in Step 66. If the second time interval has not expired, the transmitting node may transmit additional predetermined application messages during the time interval of the second timer in Step 68.

While this invention has been illustrated and described in accordance with a preferred embodiment, it is recognized that variations and changes may be made therein without departing from the invention as set forth in the following claims.

Having described the invention, what is claimed is:

1. A method for controlling data transmissions on a single channel radio frequency network which is arranged to permit data transmissions in a system for remotely monitoring and controlling portable machines, the system including a plurality of nodes comprising at least one portable machine having a microcontroller for controlling operation of the portable machine, a plurality of sensors for supplying machine operational data to the microcontroller, and a radio frequency transceiver unit which communicates with the microcontroller, and at least one host computer having a radio frequency transceiver unit; all nodes on the network having the same status and privileges, each being able to originate and receive communications; each node independently performing the same method comprising the steps initializing each node upon power up the initializing comprising setting a CTSFLAG to zero and setting a CTS timer and a RTS timer each to a predetermined value and initiating the CTS timer;

detecting an appropriate message during a predetermined interval of time, the message having a unique structure, and if the appropriate message is received;

checking the message for a request to send command, and if the send command request exists, setting the CTSFLAG to zero and starting the CTS timer, and if the send command does not exist;

checking the message for a clear to send command, and if the clear to send command is exists, setting the CTSFLAG to a one and if the clear to send command does not exist;

checking the message for an application command, and if the application command exists, responding to the originating node of the command;

upon not detecting an appropriate message, continuing to scan for an appropriate message;

determining a present need to transmit a message to a predetermined node;

checking the value of the CTSFLAG and if it is zero, checking to see if the CTS timer has expired;

if the CTS timer has expired, simultaneously transmitting a message having a request to send command to all nodes on the network and starting the RTS timer;

transmitting an appropriate application message to the predetermined node on the network;

waiting for an appropriate response from the predetermined node on the network, and if an appropriate response is not detected from said node, incrementing a loop counter and waiting a predetermined time interval to re-transmit the application message;

after an appropriate response is detected from the predetermined node, determining if the time interval of the RTS timer has expired, and if it has expired, transmitting a clear to send message to all nodes on the network and setting the CTSFLAG to one; and if the RTS timer has not expired, transmitting additional application messages during the time interval of the RTS timer.

2. A method for controlling data transmissions on a single channel radio frequency network, as claimed in claim 1, and wherein the CTS timer times an interval of time during which a clear to send command is detected.

3. A method for controlling data transmissions on a single channel radio frequency network, as claimed in claim 1, and wherein the appropriate message has a message structure comprising a STX field, a destination address field, an origin address field, a command field, a data field length, a data field and a check sum field.

4. A method for controlling data transmissions on a single channel radio frequency network, as claimed in claim 3, and wherein the predetermined time interval for waiting to retransmit is determined by determining a value of the transmitting node's origin address and multiplying said value by a loopcount, to obtain a number, and multiplying said number by a predetermined constant.

* * * * *